US007080253B2

(12) United States Patent
Weare

(10) Patent No.: US 7,080,253 B2
(45) Date of Patent: Jul. 18, 2006

(54) AUDIO FINGERPRINTING

(75) Inventor: Christopher Bruce Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/177,083

(22) Filed: Jul. 8, 2005

(65) Prior Publication Data

US 2005/0289065 A1 Dec. 29, 2005

Related U.S. Application Data

(63) Continuation of application No. 09/928,004, filed on Aug. 10, 2001, now Pat. No. 6,963,975.

(60) Provisional application No. 60/224,841, filed on Aug. 11, 2000.

(51) Int. Cl.
*H03M 1/00* (2006.01)
*G09C 5/00* (2006.01)
*H04K 1/00* (2006.01)
*H04L 9/00* (2006.01)

(52) U.S. Cl. ......................... 713/176; 705/51; 708/200

(58) Field of Classification Search ..................... None
See application file for complete search history.

(56) References Cited

U.S. PATENT DOCUMENTS 3,919,479 A * 11/1975 Moon et al. ................ 704/237
4,282,403 A * 8/1981 Sakoe ........................ 704/234
4,432,096 A * 2/1984 Bunge ........................ 704/206
4,450,531 A * 5/1984 Kenyon et al. ................ 708/5
4,843,562 A * 6/1989 Kenyon et al. ............... 702/73
5,414,795 A * 5/1995 Tsutsui et al. .............. 704/204
5,535,300 A * 7/1996 Hall et al. .................. 704/227
5,546,462 A 8/1996 Indeck et al. ................. 380/23
5,651,090 A * 7/1997 Moriya et al. ........... 704/200.1
5,715,372 A * 2/1998 Meyers et al. ................ 706/16
5,918,223 A 6/1999 Blum et al. ..................... 707/1
RE36,714 E * 5/2000 Brandenburg et al. ...... 704/227
6,298,322 B1 * 10/2001 Lindemann ................. 704/222
6,834,308 B1 12/2004 Ikezoye et al. ............. 709/231
2002/0133499 A1 9/2002 Ward et al. ................. 707/102
2002/0156712 A1 10/2002 Rambhia ..................... 705/36
2002/0181711 A1 * 12/2002 Logan et al. .................. 381/1
2003/0079222 A1 * 4/2003 Boykin et al. ................ 725/31

OTHER PUBLICATIONS

Appelbaum, M. et al., "Agile—A CAD/ CAM/ CAE Interface Language," *Society of Manufacturing Engineers: Technical Paper*, 1984, MS84-182, 1-19.
Bendix, L. et al., "CoEd—A Tool for Versioning of Hierarchical Documents," B. Magnusson (Ed.), *System Configuration Management, Proc. ECOOP'98 SCM-8 Symposium*, Brussels, Belgium, Jul. 20-21, 1998.

(Continued)

*Primary Examiner*—Emmanuel L. Moise
*Assistant Examiner*—Tamara Teslovich
(74) *Attorney, Agent, or Firm*—Woodcock Washburn LLP

(57) ABSTRACT

A system and methods for the creation, management, and distribution of media entity fingerprinting are provided. In connection with a system that convergently merges perceptual and digital signal processing analysis of media entities for purposes of classifying the media entities, various means are provided to a user for automatically processing fingerprints for media entities for distribution to participating users. Techniques for providing efficient calculation and distribution of fingerprints for use in satisfying copyright regulations and in facilitating the association of meta data to media entities are included. In an illustrative implementation, the fingerprints may be generated and stored allowing for persistence of media from experience to experience.

17 Claims, 9 Drawing Sheets

OTHER PUBLICATIONS

Biglari-Abhari, M. et al., "Improving Binary Compatibility in VLIW Machines through Compiler Assisted Dynamic Rescheduling," *IEEE*, 2000, 386-393.
Boneh, D. et al., "Collusion-secure fingerprinting for digital data," *IEEE Trans. Information Theory*, 1998, 44(5), 1897-1905.
Bratsberg, S.E., "Unified Class Evolution by Object-Oriented Views," Pernul, G. et al. (Eds.), *Entity-Relationship Approach—ER '92. Proc. 11th International Conference on the Entity-Relationship Approach* , Karlsruhe, Germany, Oct. 7-9, 1992, 423-439.
Bresin, R. et al., "Synthesis and decoding of emotionally expressive music performance," *IEEE SMC'99 Conference Proceedings. 1999 IEEE Int'l Conf. On Systems, Man, and Cybernetics*, 1999, vol. 4, 317-322.
Camurri, A. et al., "Multi-Paradigm Software Environment for the Real-Time Processing of Sound, Music and Multimedia," *Knowledge-Based Systems*, 1994, 7(2), 114-126.
Camurri, A. et al., "Music and Multimedia Knowledge Representation and Reasoning—The Harp System," *Computer Music J.*, 1995, 19(2sum), 34-58.
Camurri, A., "Music content processing and multimedia: Case studies and emerging applications of intelligent interactive systems," *J. New Music Res.*, 1999, 28(4), 351-363.
Clamen, S.M., "Schema Evolution and Integration", *Distributed and Parallel Databases 2*, 1994, 2, 101-126.
Cohen, W.W. et al., "Web-collaborative filtering: recommending music by crawling the Web," *Computer Networks*, 2000, 33, 685-698.
Conradi, R. "Version Models for Software Configuration Management," *ACM Computing Surveys*, Jun. 1998, 30(2), 232-282.
Conradi, R. et al., "Change-Oriented Versioning: Rationale and Evaluation," *Third Int'l Workshop—Software Engineering & Its Applications*, Dec. 3-7, 1990, Toulose, France, pp. 97-108.
Craner, P.M., "New Tool for an Ancient Art: The Computer and Music," *Computers and Humanities*, 1991, 25, 303-313.
De Castro, C. et al., "Schema Versioning for Multitemporal Relational Databases," *Information Systems*, 1997, 22(5), 249-290.
DeRoure, D.C. et al., "Content-based navigation of music using melodic pitch contours," *Multimedia Systems*, 2000, 8, 190-200.
Drossopoulou, S. et al., "A Fragment Calculus -towards a model of Separate Compilation, Linking and Binary Compatibility," *14th Symposium on Logic in Computer Science—IEEE Computer Society*, Jul. 2-5, 1999, Los Alamitos, California, pp. 147-156.
Eisenberg, M. "Programmable applications: exploring the potential for language/interface symbiosys," *Behaviour & Information Technology*, 1995, 14(1), 56-66.
Franconi, E. et al., "A Semantic Approach for Schema Evolution and Versioning in Object-Oriented Databases," J. Lloyd et al., (Eds.), *Computational Logic—CL 2000: Proc. First Int'l Conference*, Jul. 24-28, 2000, London, UK, pp. 1048-1062.
Gal, A. et al., "A Multiagent Update Process in a Databased with Temporal Data Dependencies and Schema Versioning," *IEEE Transactions on Knowledge and Data Engineering*, Jan./Feb. 1998, 10(1), 21-37.
Gentner, T. et al., "Perceptual classification based on the component structure of song in European starlings," *J. Acoust. Soc. Am.*, Jun. 2000, 107(6), 3369-3381.
Goddard, N.J., "Using the "C" programming language for interface control," *Laboratory Microcomputer*, Autumn 1982, 15-22.
Goldman, C.V. et al., "NetNeg: A connectionist-agent integrated system for representing musical knowledge," *Annals of Mathematics and Artificial Intelligence*, 1999, 25, 69-90.
Goldstein, T. et al., "The Object Binary Interface—C++ Objects for Evolvable Shared Class Libraries," *Proc. 1994 USENIX C++ Conference*, Apr. 11-14, 1994, Cambridge, MA, 1-18.
Hori, T. et al., "Automatic music score recognition/play system based on decision based neural network," *1999 IEEE Third Workshop on Multimedia Signal Processing*, Ostermann, J. et al. (eds.), 1999, 183-184.
Kieckhefer, E. et al., "A computer program for sequencing and presenting complex sounds for auditory neuroimaging studies," *J. Neurosc. Methods*, Aug., 2000, 101(1), 43-48.
Kirk, R. et al., "Midas-Milan—an open distributed processing system for audio signal processing," *J. Audio Enginerr. Soc.*, 1996, 44(3), 119-129.
Krulwich, B., "Lifestyle finder—Intelligent user profiling using large-scale demographic data," *AI Magazine*, 1997, 18(2sum), 37-45.
Lethaby, N., "Multitasking with C++," *Proc. of the 5th Annual Embedded Systems Conference*, Oct. 5-8, 1993, Santa Clara, CA, 2, 103-120.
Lewine, D., "Certifying Binary Applications," *Proc. of the Spring 1992 EurOpen & USENIX Workshop*, Apr. 6-9, 1992, Jersey, Channel Islands, 25-32.
Li, D. et al., "Classification of general audio data for content-based retrieval," *Pattern Recogn. Letts.*, 2001, 22(5), 533-544.
Liang, R.H. et al., "Impromptu Conductor—A Virtual Reality System for Music Generation Based on Supervised Learning," *Displays*, 1994, 15(3), 141-147.
Logrippo, L., "Cluster analysis for the computer-assisted statistical analysis of melodies," *Computers Humanities*, 1986, 20(1), 19-33.
Moreno, P.J. et al., "Using the Fisher Kernal Method for Web Audio Classification," *2000 IEEE Int'l Conf. on Acoustics, Speech, and Signal Processing, Proceedings*, 2000, vol. 4, 2417-2420.
Morrison, I. et al., "The Design and Prototype Implementation of a "Structure Attribute" Model for Tool Interface Within an IPSE," *Microprocessing and Microprogramming*, 1986, 18, 223-240.
Oiwa, Y. et al., "Extending Java Virtual Machine with Integer-Reference Conversion," *Concurrency: Practice and Experience*, May 2000, 12(6), 407-422.
Oussalah, C. et al., "Complex Object Versioning," *Advanced Information Systems Engineering—Proc. 9th Int'l. Conference, CaiSE'97*, Jun. 16-20, 1997, Catalonia Spain, 259-272.
Pesavento, M. et al., "Unitary Root-MUSIC with a Real-Valued Eigendecomposition: A Theoretical and Experimental Performance Study," *IEEE Transactions on Signal Processing*, May 2000, 48(5), 1306-1314.
Pirn, R., "Some Objective and Subjective Aspects of 3 Acoustically Variable Halls," *Appl. Acoustics*, 1992, 35(3), 221-231.

Proper, H.A., "Data schema design as a schema evolution process", *Data & Knowledge Engineering*, 1997, 22, 159-189.
Roddick, J.F., "A survey of schema versioning issues for database systems," *Information and Software Technology*, 1995, 37(7), 383-393.
Rose, E. et al., "Schema versioning in a temporal object-oriented data model," *Int'l Journal on Artificial Intelligence Tools*, 1998, 7(3), 293-318.
Serra, A., "New solutions for the transmission of music. Possible methods in view of the reduction of the pass band," *Revista Espanola de Electronica*, Jul., 1976, 23(260), 34-35 (English language abstract attached).
Smith, M.W.A., "A relational database for the study and quantification of tempo directions in music," *Comput. Humanities*, 1994, 28(2), 107-116.
Speiser, J.M. et al., "Signal processing computations using the generalized singular value decomposition," *Proceedings of SPIE—The Int'l Socity for Optical Engineering. Real Time Signal Processing VII*, Bellingham, WA, 1984, 47-55.
Surveyer, J., "C+=(C-Sharp==Microsoft Java++)? True:False;", *Java Report*, Oct. 2000, 5 pages.
Tsotras, V. et al., "Optimal Versioning of Objects," *Eighth Int'l. Conference on Data Engineering—IEEE Computer Society*, Feb. 2-3, 1992, Tempe, Arizona, 358-365.
Urtado, C. et al., "Complex entity versioning at two granularity levels," *Information Systems*, 1998, 23(3/4), 197-216.
Wieczerzycki, W., "Advanced versioning mechanisms supporting CSCW environments," *Journal of System Architecture*, 1997, 43, 215-227.
Yoder, M.A. et al., "Using Multimedia and the Web to teach the theory of digital multimedia signals," *Proceedings. Frontiers in Education, 1995 25th Annual Conference. Engineering Education for the 21st Century, IEEE*, Budny, D. et al. (eds.), Nov. 1-4, 1995, vol. 2, Atlanta, GA.
Zhang, T. et al., "Audio content analysis for online audiovisual data segmentation and classification," *IEEE Trans. on Speech and Audio Processing*, May, 2001, 9(4), 441-457.
Zhang, T. et al., "Heuristic approach for generic audio data segmentation and annotation," *Proceedings ACM Multimedia 99*, 1999, 67-76.

* cited by examiner

700

AUDIO FINGERPRINTING

CROSS REFERENCE TO RELATED APPLICATIONS

This application is a continuation of U.S. application Ser. No. 09/928,004, filed Aug. 10, 2001, now U.S. Pat. No. 6,963,975, which claims the benefit of U.S. Provisional Application No. 60/224,841, filed Aug. 11, 2000, which is hereby incorporated by reference in its entirety.

This application is related to co-pending application entitled "Audio Fingerprinting" U.S. application Ser. No. 11/177,089, filed Jul. 8, 2005.

DISCLAIMER

The names of actual recording artist mentioned herein may be the trademarks of their respective owners. No association with any recording artist is intended or should be inferred.

TECHNICAL FIELD

The present invention relates to a system and method for creating, managing, and processing fingerprints for media data.

BACKGROUND

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as Amazon.com, Inc., barnesandnoble.com, cdnow.com, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of Amazon.com, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

With the explosion of media entity data distribution (e.g. online music content), comes an increase in the demand by media authors and publishers to authenticate the media entities to be authorized, and not illegal copies of an original work such to place the media entity outside of copyright violation inquires. Concurrent with the need to combat epidemic copyright violations, there exists a need to readily and reliably identify media entity data so that accurate metadata can be associated to media entity data to offer descriptions for the underlying media entity data. Metadata available for a given media entity can include artist, album, song, information, as well as genre, tempo, lyrics, etc. The underlying computing environment can provide additional obstacles in the creation and distribution of such accurate metadata. For example, peer-to-peer networks exasperate the problem by propagating invalid metadata along with the media entity data. The task of generating accurate and reliable metadata is made difficult by the numerous forms and compression rates that media entity data may reside and be communicated (e.g. PCM, MP3, and WMA). Media entity can be further altered by the multiple trans-coding processes that are applied to media entity data. Currently, simple hash algorithms are employed in processes to identify and distinguish media entity data. These hashing algorithms are not practical and prove to be cumbersome given the number of digitally unique ways a piece of music can be encoded.

Accordingly there is a need for improved methods of accurately recognizing media content so that content may be readily and reliably authorized to satisfy copyright regulations and also so that a trusted source of metadata can be utilized. Generally, metadata is embedded data that is employed to identify, authorize, validate, authenticate, and distinguish media entity data. The identification of media entity data can be realized by employing classification techniques described above to categorize the media entity according to its inherent characteristics (e.g. for a song to classify the song according to the song's tempo, consonance, genre, etc.). Once classified, the present invention exploits the classification attributes to generate a unique fingerprint (e.g. a unique identifier that can be calculated on the fly) for a given media entity. Further, fingerprinting media is an extremely effective tool to authenticate and identify authorized media entity copies since copying, trans-coding, or reformating media entities will not adversely affect the fingerprint of said entity. In the context of metadata, by using the inventive concepts of fingerprinting found in the present invention, metadata can more easily, efficiently, and more reliably be associated to one or more media entities. It would be desirable to provide a system and methods as a result of which participating users are offered identifiable media entities based upon users' input. It would be still further desirable to aggregate a range of media objects of varying types and the metadata thereof, or categories using various categorization and prioritization methods in connection with media fingerprinting techniques in an effort to satisfy copyright regulations and to offer reliable metadata.

SUMMARY

In view of the foregoing, the present invention provides a system and methods for creating, managing, and authenticating fingerprints for media used to identify, validate, distinguish, and categorize, media data. In connection with a system that convergently merges perceptual and digital signal processing analysis of media entities for purposes of classifying the media entities, the present invention provides various means to aggregate a range of media objects and meta-data thereof according to unique fingerprints that are associated with the media objects. The fingerprinting of media contemplates the use of one or more fingerprinting algorithms to quantify samples of media entities. The quantified samples are employed to authenticate and/or identify media entities in the context of media entity distribution platform.

Other features of the present invention are described below.

BRIEF DESCRIPTION OF THE DRAWINGS

The system and methods for the creation, management, and authentication of media fingerprinting are further described with reference to the accompanying drawings in which.

DETAILED DESCRIPTION OF ILLUSTRATIVE EMBODIMENTS

Overview

The proliferation of media entity distribution (e.g. online music distribution) has lead to the explosion of what some have construed as rampant copyright violations. Copyright violations of media may be averted if the media object in question is readily authenticated to be deemed an authorized copy. The present invention provides systems and methods that enable the verification of the identity of an audio recording that allows for the determination of copyright verification. The present invention contemplates the use of minimal processing power to verify the identification of media entities. In an illustrative implementation, the media entity data can be created from a digital transfer of data from a compact disc recording or from an analog to digital conversion process from a CD or other analog audio medium.

The methods of the present invention is robust in determining the identity of a file that might have been compressed using one of the readily available of future developed compression formats. Unlike, conventional data identification techniques such as digital watermarking, the system and methods of the present invention do not require that a signal be embedded into the media entity data.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 1:
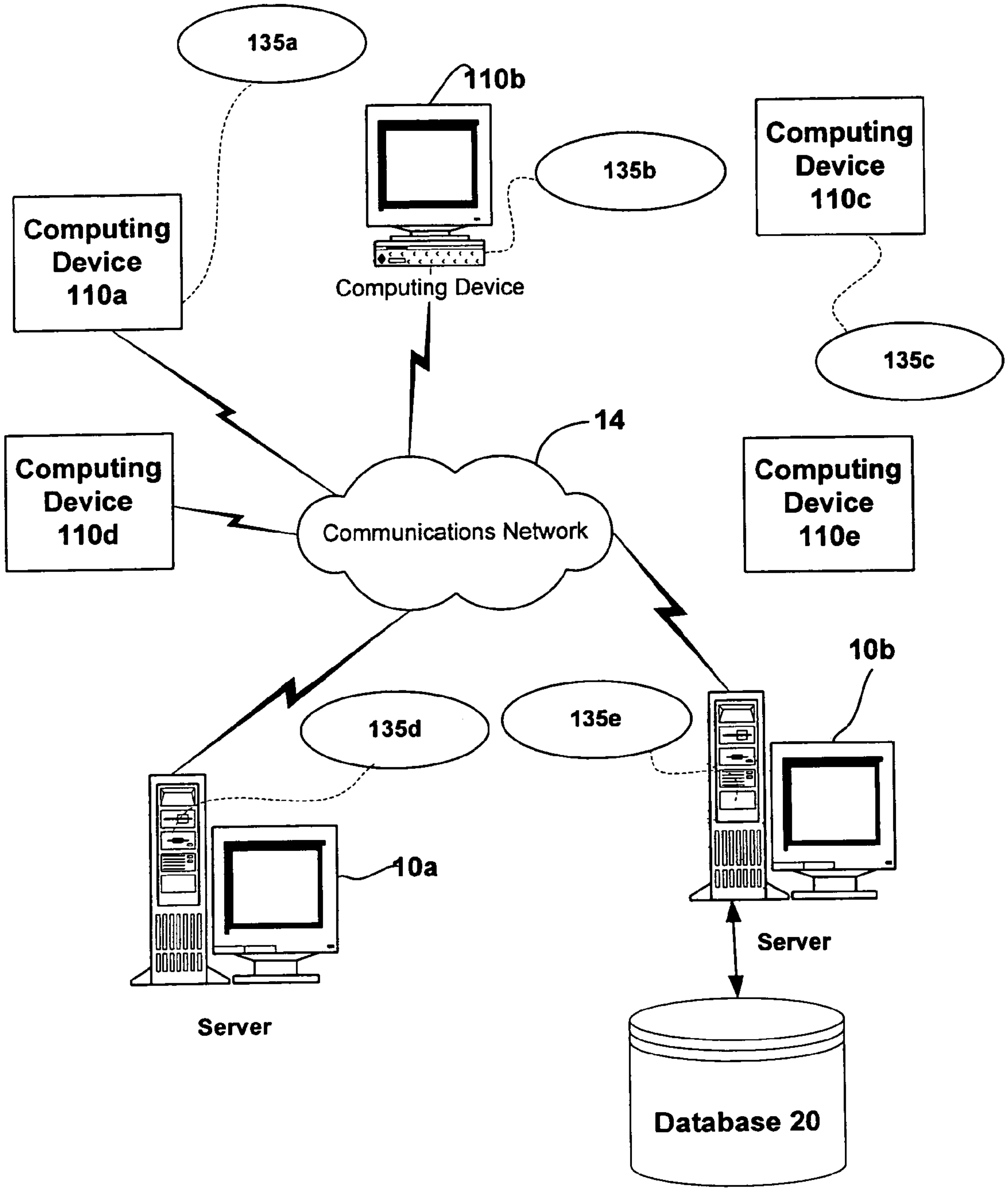
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10*a*, 10*b*, etc., are interconnected via a communications network 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110*a*, 110*b*, 110*c*, 110*d*, 110*e*, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10*a*, 10*b*, etc. may be responsible for the maintenance and updating of a database 20 in accordance with the present invention, such as a database 20 for storing classification information, music and/or software incident thereto. Thus, the present invention can be utilized in a computer network environment having client computers 110*a*, 110*b*, etc. for accessing and interacting with a computer network 14 and server computers 10*a*, 10*b*, etc. for interacting with client computers 110*a*, 110*b*, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
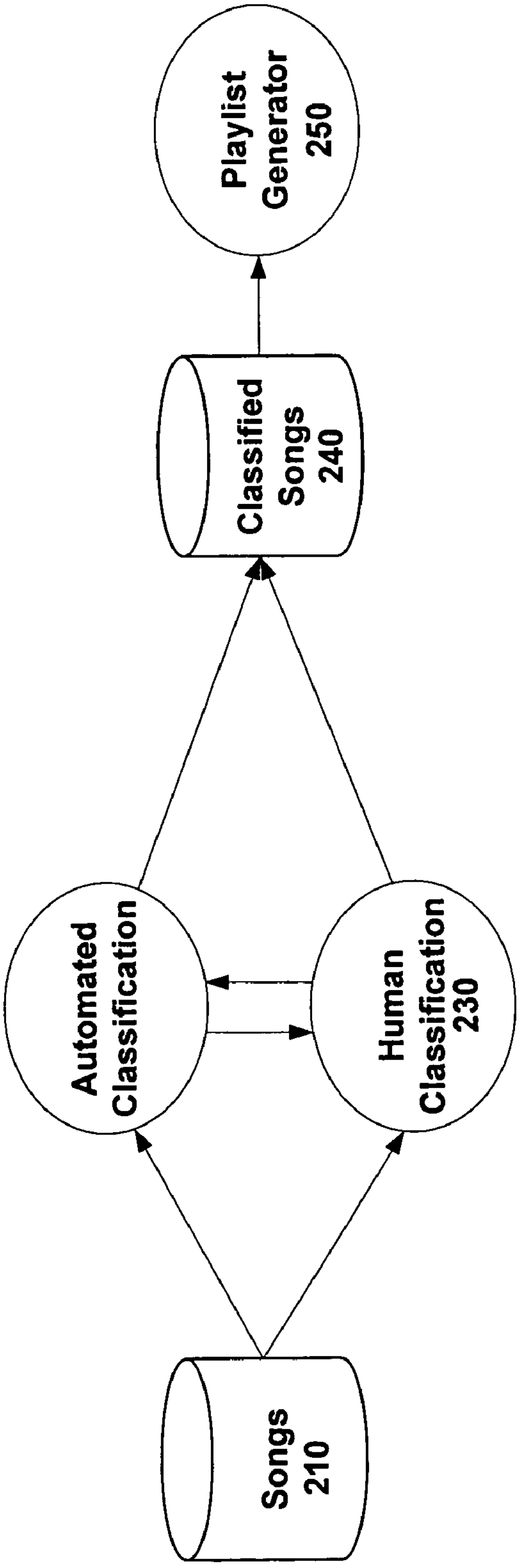
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music. In effect, the rules can be used as a filter to supplement any other decision making processes with respect to the new music.

Figure 3:
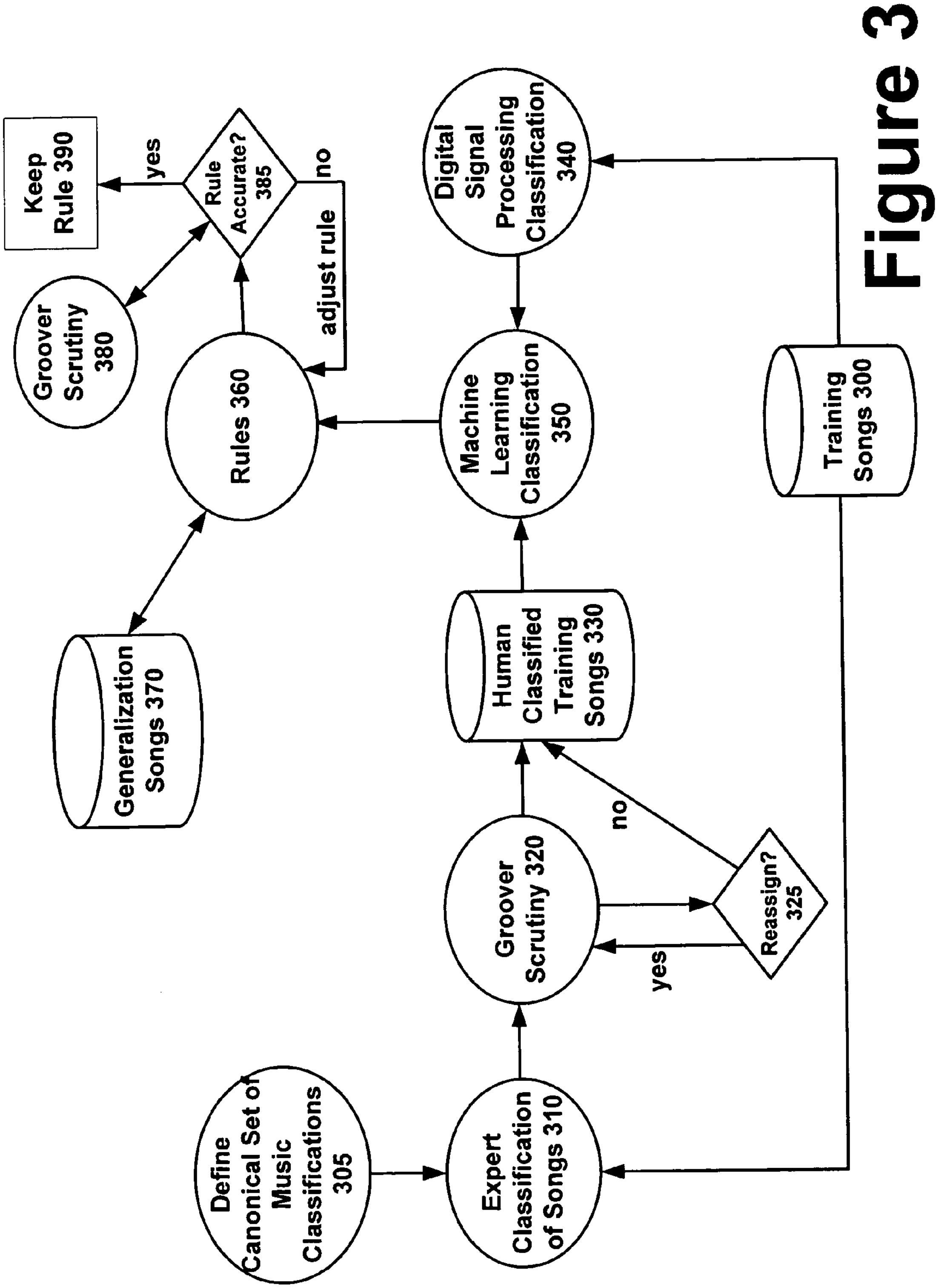
FIG. 3 is block diagram illustrating an exemplary method of the generation of general media classification rules from analyzing the convergence of classification in part based upon subjective and in part based upon digital signal processing techniques.

FIG. 3 illustrates an embodiment of the invention, which generates generalized rules for a classification system. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92–95% accuracy. The groover scrutiny reevaluates the classification of 310, and reclassifies the music at 325 if the groover determines that reassignment should be performed before storing the song in human classified training song database 330.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. This mapping enables content-based searching of media, which in part enables the automatic transmission of high affinity media content, as described below.

Fingerprinting Overview

Figure 4:
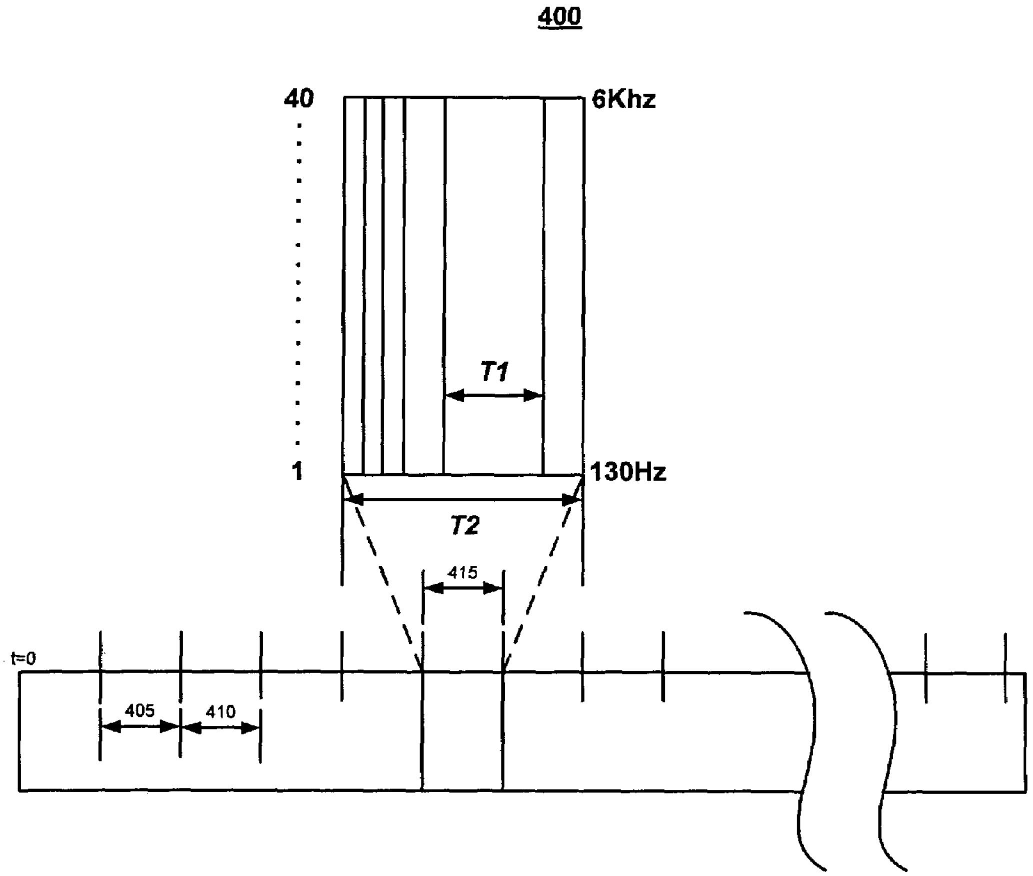
FIG. 4 is a block diagram showing an exemplary media entity data file and components thereof used when calculating a fingerprint in accordance with the present invention.
Figure 6:
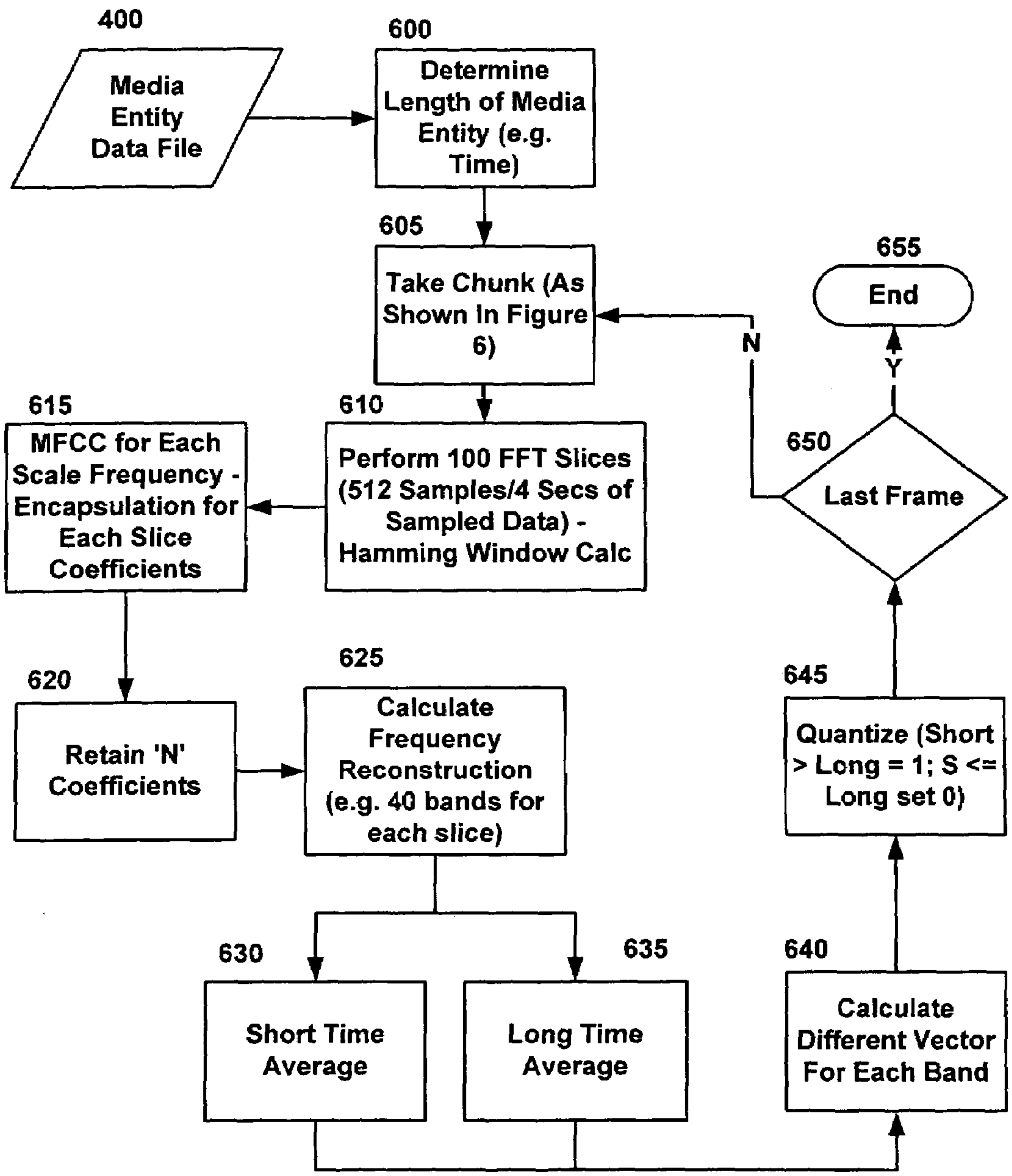
FIG. 6 is a flow diagram of detailed processing performed to calculate a fingerprint in accordance with the present invention.

FIG. 4 shows a block diagram of an exemplary media entity data file (e.g. a digitized song) and the cooperation of components of the exemplary media entity data file that provide necessary data for processing fingerprints. As shown in FIG. 4, media entity data file 400 comprises various data regions 405, 410, 415. In the example provided, regions 405, 410, and 415 correspond to various parts of a song. In operation, and as described above, the media entity data file 400 (and corresponding regions 405, 410, and 415) is read to provide a sampling region and/or "chunk" (in the example shown region 415 serves as the sampling region) used for processing as shown in FIG. 6.

Central to the processing is the fact that every perceptually unique media entity data file, possesses a unique set of perceptually relevant attributes that humans use to distinguish between perceptually distinct media entities (e.g. different attributes for music). A representation of these attributes, referred to hereafter as the fingerprint, are extracted by the present invention from the media entity data file with the use of digital audio signal processing (DSP) techniques. These perceptually relevant attributes are then employed by the current method to distinguish between recordings. The perceptually relevant attributes may be classified and analyzed in accordance with the exemplary media entity classification and analysis system described above.

The set of attributes that constitute the fingerprint may consist of the following elements:

Average information density

Average standard deviation of the information density

Average spectral band energy

Average standard deviation of the spectral band energy.

Play-time of the digital audio file in seconds

In operation, the average information density is taken to be the average entropy per processing frame where a processing frame is taken to be a number of media entity data file (e.g. in the example provided by FIG. 6, audio samples), typically in the range of 1024 to 4096 samples of the media entity data file. The entropy, s, of processing frame j may be expressed as:

$$S_{ave} = \frac{\sum_j S_j}{N},$$

where $b_n$ is the absolute value of the $n^{th}$ binary of the L1 normalized spectral bands of the processing frame and where log2(.) is the log base two function. The average entropy for a given segment of the media entity data file, S can then be expressed as:

$$S_{std} = \frac{\sqrt{\sum_j (S_{ave} - S_j)^2}}{N}$$

where N is the total number of processing frames.

$$S_{std} = \frac{\sqrt{\sum_j (S_{ave} - S_j)^2}}{N}$$

Comparatively, the spectral bands are calculated by taking the real FFT of each processing frame, dividing the data into separate spectral bands and squaring the sum of the bins in each band. The average of the bands for a given segment of the media entity data file, $\vec{C}$, may be expressed as:

$$\vec{C}_{ave} = \frac{\sum_j \vec{C}_j}{N}$$

where $\vec{C}_j$ is a vector of values consisting of the critical band energy in each critical band.

$$\vec{C}_{std} = \frac{\sqrt{\sum_j \left(\vec{C}_{ave} - \vec{C}_j\right)^2}}{N}.$$

In order to efficiently compare fingerprints it is advantageous to represent the fingerprint of a media entity as a bit sequence so as to allow efficient bit-to-bit comparisons between fingerprints. The Hamming distance, i.e., the number of bits by which two fingerprints differ, is employed as the metric of distance. In order to convert the calculated perceptual attributes described above to a format suitable for bit-to-bit comparisons, a quantization technique, as described in the preferred embodiment given below, is employed.

Figure 5:
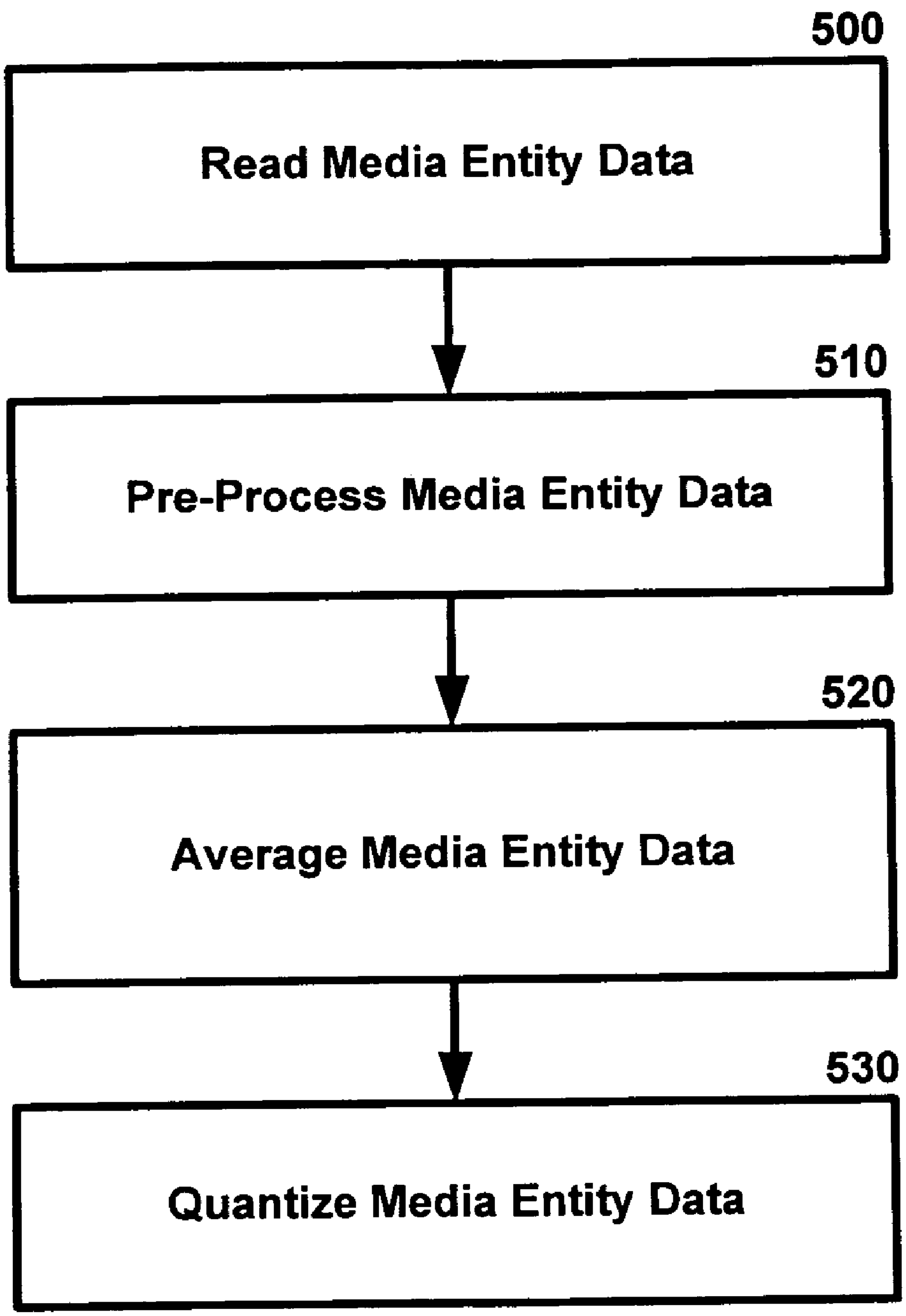
FIG. 5 illustrates an exemplary processing blocks performed to create a fingerprint of a given media entity in accordance with the present invention.

In operation, and as shown in FIG. 5 there may be up to four stages when calculating the fingerprinting algorithm, such as read, preprocess, average, and quantization. The reading stage reads at block 500 a predefined amount of data from the input file corresponding to a specified position in the media entity data file. This data is windowed into several sequential chunks, each of which is then passed onto the pre-processing stage. The preprocessing as shown at block 510 stage calculates the Mel Frequency Cepstral Coefficients (MFCCs). The most energetic coefficients are preserved and the remaining set to zero. After truncation at block 520, the inverse discrete Fourier transform (DFT) is applied to the remaining MFCCs to generate an estimate of the salient Mel Frequency coefficients. These coefficients represent as described above. The results for all chunks are stored in the matrix F.

Each column of F corresponds to a chunk, which in turn, represents a slice in time. Each row in F corresponds to a single frequency band in the Mel frequency scale. F is passed to the average stage where the average of each row is calculated and stored in the vector F. In addition the average for a subset of the elements in each row is calculated and placed in the vector S. F-S is placed in the vector D.

Subsequently, each element in D is then set to 1 if that element is greater than zero and 0 if the element is equal to or less than zero in the quantization stage at block 520. For each read, forty bits of data are generated representing the quantized bits of D. Each read typically consists of a few seconds of data. A usable fingerprint is constructed from reads at several positions in the file. Further, once a large number of fingerprints have been calculated, they can be stored in a data store cooperating with an exemplary music classification and distribution system (as described above).

As shown in FIG. 6, processing begins at block 600 where media entity data file data 400 is processed to determine its length (e.g. time duration). From there processing proceeds to block 605 where a sample is taken (as illustrated in FIG. 4) from the media entity data file. The sample comprises of N number of individual slices wherein the total sample is taken over time duration T2 and a subset sample is taken over time duration T1. The sample taken, 100 Fast Fourier Transform (FFTs) slices are performed at block 610 such that 512 samples are taken for 4 seconds of sampled data. Block 610 represents the Hamming window calculation as described above in the Fingerprinting Overview section. From there, processing proceeds to block 615 where a Mel Frequency Cepstral Coefficients (MFCC) is calculated for each scale frequency (e.g. frequency range from 130 Hz to 6 Khz for audio files). It is appreciated by one skilled in the art that although MFCC analysis is employed in the illustrative implementation, this analysis technique is merely exemplary as the present invention contemplates the use of any comparable psychoacoustically motivated analysis and processing technique that offers the same and/or similar result. Additionally, at block 615 an encapsulation of the coefficients for each slice is performed. A pre-determined number of coefficients are retained at block 620 for further processing. Using these coefficients the frequency reconstruction is calculated at block 625. For example, critical band calculations as described above are performed. The time averages are stored for further process at blocks 630 and 635 so that short time averages are stored at block 630 and long time averages are stored at block 635. From there processing proceeds to block 640 where a different vector is calculated for each critical band. The resultant vector is quantized at block 645 according to pre-defined definitions (e.g. as described above). A check is then performed at block 650 to determine if there are additional frames to be processed. If there are process reverts to block 605 and proceeds there from. However, if there are no additional frames for processing, processing terminates at block 655.

In order to quantify the performance of the present invention it is useful to consider two random bit sequences. For example, consider two random bit sequences x, and y, each of length N, where the probability of each bit-value being equal to 1 is 0.5. Alternately, one can consider the generation of the bit sequences as representing the outcomes of the toss of an evenly balanced coin, with results of heads represented as a 1 and tails representing 0. With these conditions met, the probability that bit "n" in x equals bit "n" in y equals 0.5, i.e., $$P(x(n)=y(n))=0.5 \tag{1}$$

The probability that x and y differ by M bits is, in the limit of large N (the results are reasonable for N>100), given approximately by the Normal distribution:

$$P(M)=e^{-(M-N/2)^2/2\sigma^2}/\sigma\sqrt{2\pi}, \tag{2}$$

where σ is the standard deviation of the distribution given by $$\sigma=\sqrt{N/2}, \tag{3}$$

M is known as the Hamming Distance between x and y.

The following equation (i.e. Equation 4) estimates that the probability that the hamming distance between two sequences of random bits is less than some value M', $$P(M < M') = \int_0^{M'-1} e^{-(x-N/2)^2/2\sigma^2} \big/ \sigma\sqrt{2\pi}\, dx. \tag{4}$$

Stated differently, Equation 4 gives the odds that two random sequence will fall within a certain distance, M' of each other.

In operation, Equation 4 may be used as an estimator for one aspect of the performance of the exemplary fingerprint algorithm. For example, now the two sequences x and y represent fingerprints from two separate files. Accordingly, M' now represents the threshold below which fingerprints are considered to be from the same file. Equation (4) then gives the probability of a "false positive" result. In other words, the results of Equation (4) describes that the probability that two sequences, which do not represent the same file would have a mutual hamming distance less than M'. The above assumes that the fingerprint algorithm behaves as the ideal fingerprinting algorithm, i.e., it yields statistically uncorrelated bit sequences for two files that are not from the same original file.

Ideally, when two media entity data files are derived from the same original file, for instance, ripped from the same song on a CD then stored in two different compression formats, then the Hamming distance between the fingerprints for these two files is zero in the ideal case. This is regardless of compression format of any processing performed on the files that does not destroy or distort the perceived identity of the sound files. In this case, the probability of a false positive result is given exactly by $$P(M=0)=½^N. \tag{5}$$

In reality, the exemplary fingerprinting algorithm offers a balance between the ideal properties of an ideal fingerprinting algorithm. Namely a balance is struck between the property that unrelated songs are statistically uncorrelated and that two files derived from the same master file should have a Hamming distance of zero (0). The present invention contemplates the use of an exemplary fingerprinting algorithm that offers a balance between the above named fingerprinting properties. This balance is important as it allows some flexibility in the identification of songs. For instance, both the identity as well as the quality of a media entity can be estimated by its distance from a given source media entity by measuring the distance between the two entities.

In the contemplated implementation, the fingerprinting algorithm uses a fingerprint length of 320 bytes. In addition, each fingerprint is assigned a four-byte fingerprint ID. The fingerprint data store may be indexed by fingerprint ID (e.g. a special 12 byte hash index), and by the length (e.g. in seconds), of each file assigned to a given fingerprint. This brings the total fingerprint memory requirement to 338 bytes.

Generally, access time is crucial in data store (e.g. database) applications. For that reason, the fingerprint hash index may be implemented. Specifically, each bit of the hash value corresponds to the weight of 32 bits in the fingerprint. The weight of a sequence of bits is simply the number of bits that are 1 in that sequence. When comparing two fingerprints, their hash distances are first calculated. If that distance is greater than a set value, determined by the cutoff value for the search, then it is safe to assume that the two fingerprints do not match and a further calculation of the fingerprint distance is not required. Correspondingly, if the hash distance is below a predefined limit, then it is possible that the two fingerprints could be a match so the total fingerprint distance is calculated. Using this technique, the search time for matching fingerprints is significantly reduced (e.g. by up to three orders of magnitude). For example, using the fingerprint hash index, estimates for search times on a database of one million songs for matching fingerprints are in the range of 0.2 to 0.5 seconds, depending of the degree of confidence required for the results. The higher the confidence required, the less the search time, as the search space can be more aggressively pruned. This time represents queries made directly to the fingerprint data store from an exemplary resident computer hosting the fingerprint data store. The advantages of the present invention are also realized in networked computer environments where processing times are significantly reduced.

The performance of the alternative exemplary fingerprint algorithm may be broken up into two categories: False Positive (FP) and False Negative (FN). A FP result occurs when a fingerprint is mistakenly classified as a match to another fingerprint. If a FP result occurs false metadata could be returned to the user or alternatively an unauthorized copy of a media entity may be validated to be an authorized copy. A FN result occurs when the system fails to recognize that two fingerprints match. As a result, a user might not receive the desired metadata or be precluded from obtaining desired media entities as they are deemed to stand in violation of copyright violations.

The FP performance of the exemplary fingerprint algorithm can be compared to that of the above-described ideal fingerprint algorithm. As stated, the probability of two fingerprints from the ideal fingerprint system having a distance of M or less is given by Equation 4. Equation 4 may be used as a guide for measuring the performance of the fingerprint algorithm by comparing a measured distribution of inter-fingerprint distances to the distribution for the ideal fingerprint system. The resultant measurement is the Normal distribution.

Figure 7:
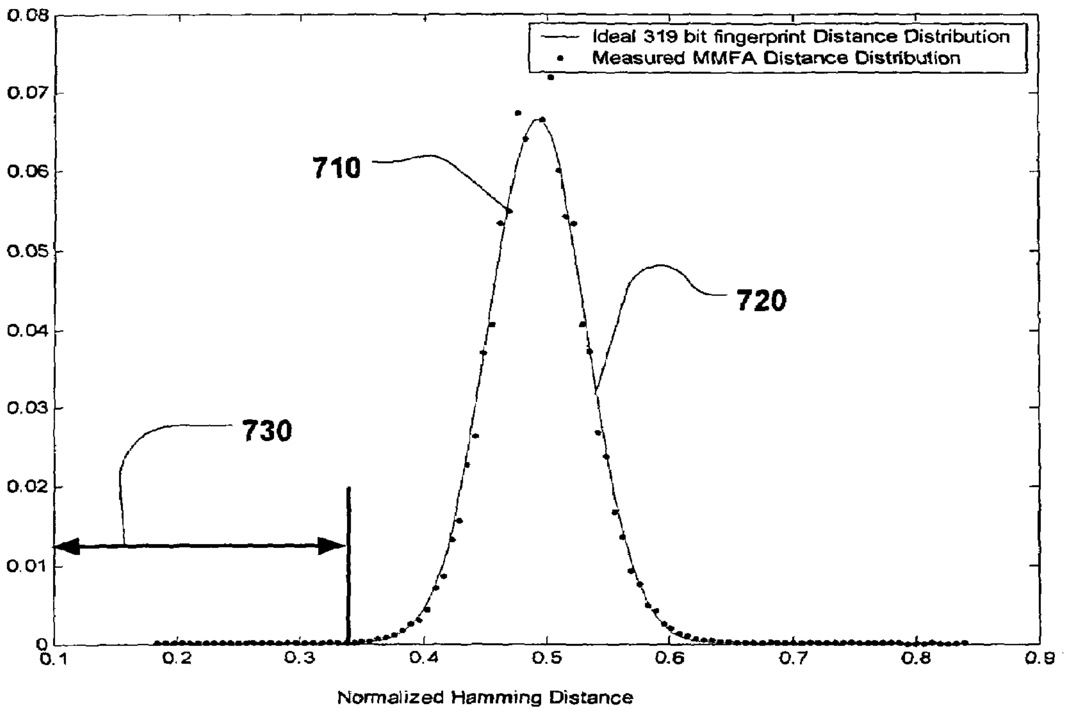
FIG. 7 is a block diagram of a hamming distance distribution curve of a fingerprinted media object in accordance with the present invention.

For example, and as shown by graph 700 in FIG. 7, the dots 710 represent the normalized histogram of one million fingerprint distance pairs. The ten thousand fingerprints used to generate the plot were selected from an exemplary fingerprint data store at random. The horizontal axis is the normalized hamming distance. The line 720 of FIG. 7 shows a fit of the data to a normal distribution with $\sigma$=0.0396 and $\mu$=0.4922. This corresponds to an ideal fingerprint length of 318.8 bits as determined from above-described Equation 3.

The performance below a normalized hamming distance of 0.35 as demarcated by region 730 of FIG. 7 is now described. In region 730, the idealized fingerprint has a significantly lower distance distribution than the exemplary fingerprint algorithm. This indicates that the distance distribution for the exemplary fingerprint algorithm is not accurately described by the Normal distribution in this region. This result can be explained as a consequence of the fact that the exemplary fingerprint algorithm maintains some correlation between files that differ slightly so that fingerprints from slightly different media entity data files will be recognized as coming from the same original media entity data file. The degree of correlation degrades gradually as the differences between media entity data files become more significant.

In the context of music media entity data files, some correlation is expected even for music media entity data files that come from completely different sources, i.e., a first music media entity data file might be from a David Bowie album and another might come from an Art Of Noise CD. However, both pieces are likely to have some common elements such as rhythm, melody, harmony, etc. A goal of the exemplary fingerprint algorithm during processing is to transition from correlated signals to decorrelated "noise" as a function of distance quickly enough to avoid a FP result, but gradually enough to still recognize two fingerprints as similar even if one fingerprint has come from a media entity data file that has undergone significant manipulation, thereby preventing a FN result. A benchmark for the exemplary fingerprint algorithm is the human ear. That is, both the exemplary fingerprint algorithm and the human ear are to recognize two files originate from the same song.

A FN occurs when two files, which originate from the same file are not recognized as the same file. To estimate the frequency of FN's transcoding effects on fingerprints are analyzed. For example, several media entity data files are encoded at multiple rates and compression formats, including wave files, which consist of raw PCM data, WMA files compressed at 128 KB/sec and MP3 files compressed at 64 KB/sec. The results of the analysis showed that the mean normalized distance for these pairs was 0.0251 with a standard deviation of 0.0225. The cutoff for identification is 0.15. Assuming a Normal distribution of transcoding distances, the odds of a false negative under this scenario are about 1 in 1 million. The similarity cutoff is at 0.2. The odds of the transcoded files not being recognized as similar are 1 in 10–12. Thus, the alternative exemplary fingerprint algorithm is robust to transcoding.

As mentioned above, the media contemplated by the present invention in all of its various embodiments is not limited to music or songs, but rather the invention applies to any media to which a classification technique may be applied that merges perceptual (human) analysis with acoustic (DSP) analysis for increased accuracy in classification and matching.

Figure 8:
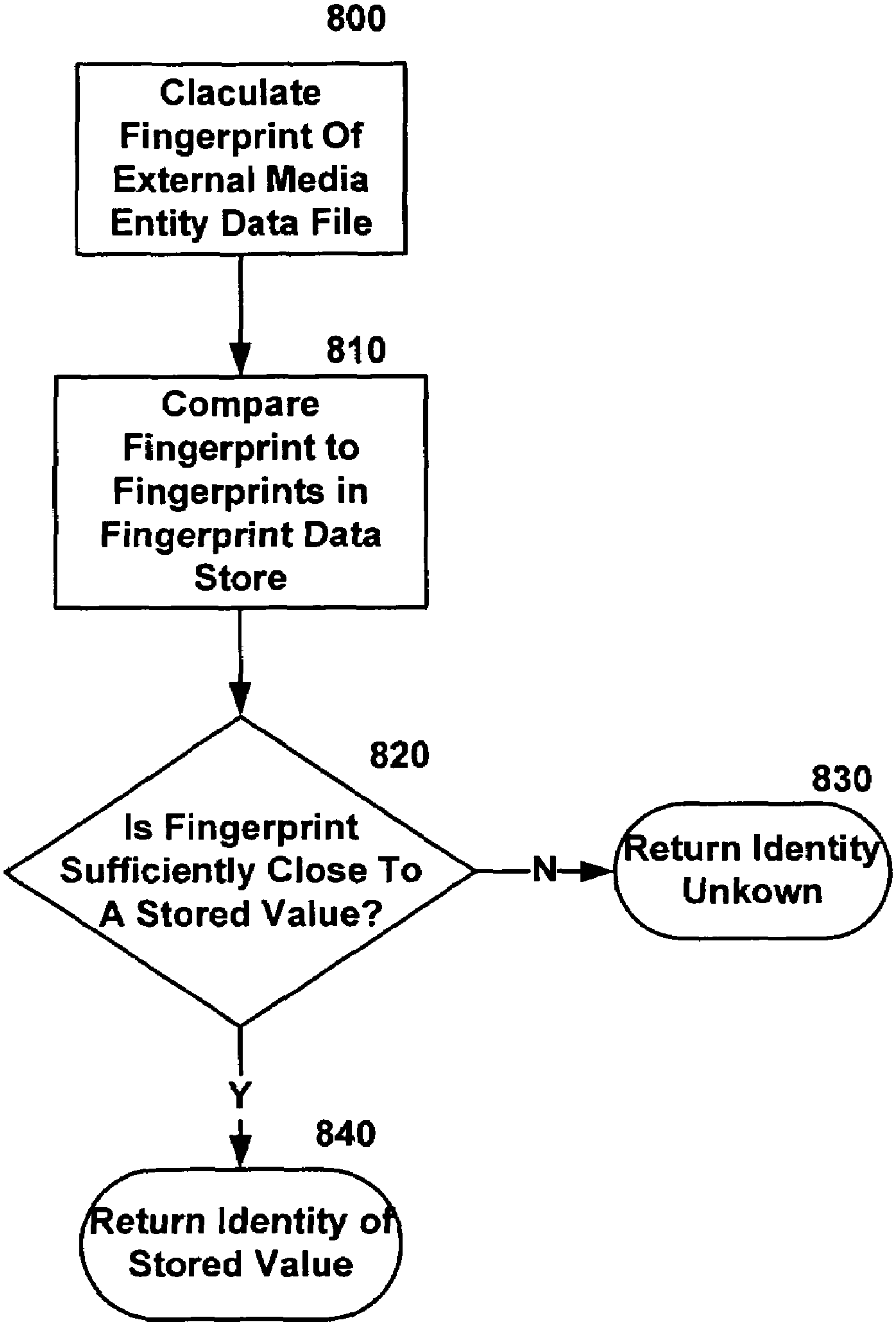
FIG. 8 is a flow diagram of the processing performed to identify a particular media entity from a database of media entities using fingerprints.

FIG. 8 shows the processing performed in the context of a media entity distribution and classification system as described above. Specifically, FIG. 8 illustrates the process of identifying an unknown song. After the "fingerprint" of a media entity is determined and stored, all copies of that media entity of comparable quality, regardless of compression type, or even recording method, will match that fingerprint. As shown processing begins at block 800 where the fingerprint of an external media entity data file is calculated. Processing proceeds to block 810 where a comparison is performed to compare the calculated fingerprint against fingerprints found in the fingerprint data store. A check is then performed at block 820 to determine if the calculated fingerprint is sufficiently close to a stored value. If it is processing proceeds to block 840 where the identity of the stored value is returned. If the alternative proves to be true, processing proceeds to block 830 where an "Identity Unknown" is returned.

As mentioned, to determine the identity of a song, the fingerprint of an unknown song is compared to a database of previously calculated fingerprints. The comparison is performed by determining the distance between the unknown fingerprint and all of the previously calculated fingerprints. The distance between the input fingerprint and an entry in the fingerprint database can be expressed as:

$$d=(\overline{M}\times[V-D])\times(\overline{M}\times[V-D])^{1},$$

where V is the unknown input fingerprint vector, D is a pre-calculated fingerprint vector in the fingerprint database, M is the scaling matrix, and t is the transpose operator. If d is below a certain threshold, typically chosen to be less than half the distance between a fingerprint database vector and its nearest neighbor, then the song is identified.

M is chosen so that the distribution of fingerprint nearest neighbors in the stored database of fingerprints is as close to a homogeneous distribution as possible. This can be accomplished by choosing M so that the standard deviation of the fingerprint nearest neighbors distribution is minimized. If this value is zero then all elements are separated from their nearest neighbor by the same amount. By minimizing the nearest neighbor standard deviation, the probability that two or more songs will have fingerprints that are so close that they will be mistaken for the same song is reduced. This can be accomplished using standard optimization techniques such as conjugate gradient, etc.

Further, the confidence in the verification or denial of the identity claim depends on the distance between the external fingerprint and the fingerprint of the media entity data file in the database to which the external file is making a claim. If the distance is significantly less than the average nearest neighbor distance between entries in the fingerprint database then the claim can be accepted with an extremely high degree of confidence.

Figure 9:
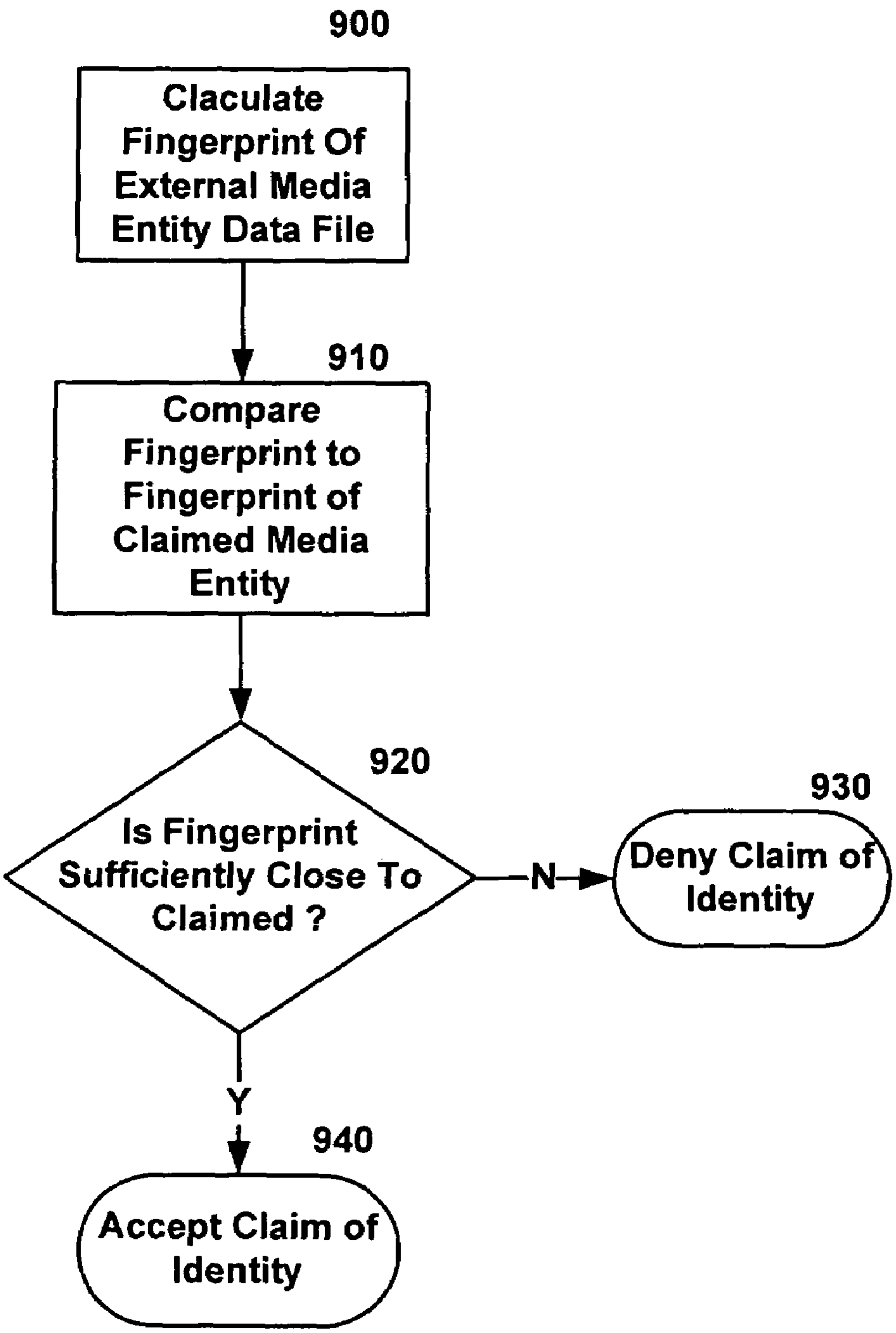
FIG. 9 is a flow diagram of the processing performed to authenticate a media entity using fingerprinting in accordance with the present invention.

In addition, the present invention is well suited to solving the current problem of copyright protection faced by many online media entity distribution services. For instance, an online media entity distribution service could use the technique to determine the identity of a media entity data file that it had acquired via unsecured means for distribution to users. Once the identity of the recording is made, the service could then determine if it is legal to distribute the digital audio file to its users. This process is better described by FIG. 9. As shown, processing begins at block 900 where a fingerprint is calculated for a given external media entity data file. Processing then proceeds to block 910 where the calculated fingerprint is compared against the fingerprint of the claimed media entity. A check is then performed at block 920 to determine if the calculated fingerprint is sufficiently close to the claimed media entity. If it is, the claim of identity is accepted at block 940. If it isn't, the claim of identity is denied at block 930.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method to calculate a fingerprint for media entities, comprising the steps of:

reading a predefined amount of data from an input media entity data file, the predefined amount of data corresponding to a specified position in said media entity data file;

windowing said predefined amount of data into a plurality of sequential chunks;

for each chunk of said plurality of sequential chunks, calculating a set of psycho-acoustic spectral coefficients;

preserving a set of energetic coefficients of the set of psycho-acoustic spectral coefficients according to at least one pre-defined criterion;

calculating the inverse Discrete Fourier Transform (DFT) to generate an estimate of the salient coefficients of the set of most energetic coefficients; and storing the results of the DFT for the plurality of sequential chunks into a matrix F, wherein a first axis of said matrix F corresponds to a slice of time of said media entities and a second axis of said matrix F correspond to a frequency band of the psycho-acoustic frequency scale.

2. The method of claim 1, wherein said first axis corresponds to columns of the matrix F and said second axis corresponds to rows, and the method further comprising:

calculating the average of each row in said matrix F;

storing the results of said calculating in a vector $\underline{F}$;

calculating the average of a subset of elements of each row in said matrix F;

storing the average of the subset of elements of each row in a vector $\underline{S}$;

calculating a vector $\underline{D}$ such that $\underline{D}$ is the difference between $\underline{F}$ and $\underline{S}$; and quantizing each element in $\underline{D}$ to a value of 1 if said each element value is greater than zero and to a value of 0 if said each element value is less than or equal to zero.

3. The method of claim 1, wherein said first axis corresponds to rows of the matrix F and said second axis corresponds to columns, and the method further comprising:

calculating the average of each row in said matrix F;

storing the results of said calculating in a vector $\underline{F}$;

calculating the average of a subset of elements of each row in said matrix F;

storing the average of the subset of elements of each row in a vector $\underline{S}$;

calculating a vector $\underline{D}$ such that $\underline{D}$ is the difference between $\underline{F}$ and $\underline{S}$; and quantizing each element in $\underline{D}$ to a value of 1 if said each element value is greater than zero and to a value of 0 if said each element value is less than or equal to zero.

4. The method of claim 1, wherein said first axis corresponds to columns of the matrix F and said second axis corresponds to rows, and the method further comprising:

calculating the average of each column in said matrix F;

storing the results of said calculating in a vector $\underline{F}$;

calculating the average of a subset of elements of each column in said matrix F;

storing the average of the subset of elements of each column in a vector $\underline{S}$;

calculating a vector $\underline{D}$ such that $\underline{D}$ is the difference between $\underline{F}$ and $\underline{S}$; and quantizing each element in $\underline{D}$ to a value of 1 if said each element value is greater than zero and to a value of 0 if said each element value is less than or equal to zero.

5. The method of claim 1, wherein said first axis corresponds to rows of the matrix F and said second axis corresponds to columns, and the method further comprising:

calculating the average of each column in said matrix F;

storing the results of said calculating in a vector $\underline{F}$;

calculating the average of a subset of elements of each column in said matrix F;

storing the average of the subset of elements of each column in a vector $\underline{S}$;

calculating a vector $\underline{D}$ such that $\underline{D}$ is the difference between $\underline{F}$ and $\underline{S}$; and quantizing each element in $\underline{D}$ to a value of 1 if said each element value is greater than zero and to a value of 0 if said each element value is less than or equal to zero.

6. The method as recited in claim 2, further comprising:

assigning a fingerprint name to the calculated and quantized vector $\underline{D}$; and storing said vector $\underline{D}$ with said assigned fingerprint name in a cooperating fingerprint data store.

7. A computer readable medium bearing computer executable instructions for carrying out the method of claim 1.

8. A method for identifying an unknown media entity by employing media entity fingerprints of a plurality of media entities, comprising the steps of:

calculating a fingerprint for at least one media entity of said plurality of media entities, including:

reading a predefined amount of data from said at least one media entity, the predefined amount of data corresponding to a specified position in said at least one media entity;

windowing said predefined amount of data into a plurality of sequential chunks;

for each chunk of said plurality of sequential chunks, calculating a set of psycho-acoustic spectral coefficients;

preserving a set of energetic coefficients of the set of psycho-acoustic spectral coefficients according to at least one pre-defined criterion;

calculating the inverse Discrete Fourier Transform (DFT) to generate an estimate of the salient coefficients of the set of most energetic coefficients;

storing the results of the DFT for the plurality of sequential chunks into a matrix F, wherein a first axis of said matrix F corresponds to a slice of time of said media entities and a second axis of said matrix F correspond to a frequency band of the psycho-acoustic frequency scale;

based upon the calculating of the fingerprint of the at least one media entity, obtaining a sequence having length L of n random bits representing said calculated fingerprint;

obtaining a sequence having a length L of N random bits of said unknown media entity for identification;

comparing said n bits with said N bits; and evaluating the results of said comparing to determine an estimate of similarity.

9. The method as recited in claim 8, wherein said comparing step is based on a Hamming distance between each fingerprint bit and the corresponding unknown media entity bit to determine the probability that two corresponding bits differ by the Hamming distance according to the relation, $$P(M)=e^{-(M-N/2)^2/2\sigma^2}/\sigma\sqrt{2\pi},$$

wherein σ is the standard deviation of the distribution expressed as, $$\sigma=\sqrt{N/2}.$$

10. The method as recited in claim 9, further comprising the step of calculating the probability that the Hamming distance between two sequences of random bits is less than a value M' according to the relation, $$P(M<M')=\int_0^{M'-1} e^{-(x-N/2)^2/2\sigma^2}/\sigma\sqrt{2\pi}\,dx.$$

11. A computer readable medium bearing computer executable instructions for carrying out the method of claim 8.

12. A system for calculating a fingerprint for media entities, comprising:

means for reading a predefined amount of data from an input media entity data file, the predefined amount of data corresponding to a specified position in said media entity data file;

means for windowing said predefined amount of data into a plurality of sequential chunks;

means for calculating a set of psycho-acoustic spectral coefficients for each chunk of said plurality of sequential chunks;

means for preserving a set of energetic coefficients of the set of psycho-acoustic spectral coefficients according to at least one pre-defined criterion;

means for calculating the inverse Discrete Fourier Transform (DFT) to generate an estimate of the salient coefficients of the set of most energetic coefficients; and means for storing the results of the DFT for the plurality of sequential chunks into a matrix F, wherein a first axis of said matrix F corresponds to a slice of time of said media entities and a second axis of said matrix F correspond to a frequency band of the psycho-acoustic frequency scale.

13. The system of claim 12, wherein said first axis corresponds to columns of the matrix F and said second axis corresponds to rows, and the system further comprises:

means for calculating the average of each row in said matrix F;

means for storing the results of said calculating in a vector $\underline{E}$;

means for calculating the average of a subset of elements of each row in said matrix F;

means for storing the average of the subset of elements of each row in a vector $\underline{S}$;

means for calculating a vector $\underline{D}$ such that $\underline{D}$ is the difference between $\underline{E}$ and $\underline{S}$; and means for quantizing each element in $\underline{D}$ to a value of 1 if said each element value is greater than zero and to a value of 0 if said each element value is less than or equal to zero.

14. The system of claim 12, wherein said first axis corresponds to rows of the matrix F and said second axis corresponds to columns, and the system further comprises:

means for calculating the average of each row in said matrix F;

means for storing the results of said calculating in a vector $\underline{E}$;

means for calculating the average of a subset of elements of each row in said matrix F;

means for storing the average of the subset of elements of each row in a vector $\underline{S}$;

means for calculating a vector $\underline{D}$ such that $\underline{D}$ is the difference between $\underline{E}$ and $\underline{S}$; and means for quantizing each element in $\underline{D}$ to a value of 1 if said each element value is greater than zero and to a value of 0 if said each element value is less than or equal to zero.

15. The system of claim 12, wherein said first axis corresponds to columns of the matrix F and said second axis corresponds to rows, and the system further comprises:

means for calculating the average of each column in said matrix F;

means for storing the results of said calculating in a vector $\underline{E}$;

means for calculating the average of a subset of elements of each column in said matrix F;

means for storing the average of the subset of elements of each column in a vector $\underline{S}$;

means for calculating a vector $\underline{D}$ such that $\underline{D}$ is the difference between $\underline{E}$ and $\underline{S}$; and means for quantizing each element in $\underline{D}$ to a value of 1 if said each element value is greater than zero and to a value of 0 if said each element value is less than or equal to zero.

16. The system of claim 12, wherein said first axis corresponds to rows of the matrix F and said second axis corresponds to columns, and the system further comprises:

means for calculating the average of each column in said matrix F;

means for storing the results of said calculating in a vector $\underline{E}$;

means for calculating the average of a subset of elements of each column in said matrix F;

means for storing the average of the subset of elements of each column in a vector S;

means for calculating a vector D such that D is the difference between F and S; and means for quantizing each element in D to a value of 1 if said each element value is greater than zero and to a value of 0 if said each element value is less than or equal to zero.

17. The system as recited in claim 13, further comprising:

means for assigning a fingerprint name to the calculated and quantized vector D; and means for storing said vector D with said assigned fingerprint name in a cooperating fingerprint data store.

* * * * *